Feb. 28, 1961    B. W. OSWALT    2,972,866
BRAKE SYSTEM
Filed July 3, 1958    2 Sheets-Sheet 2

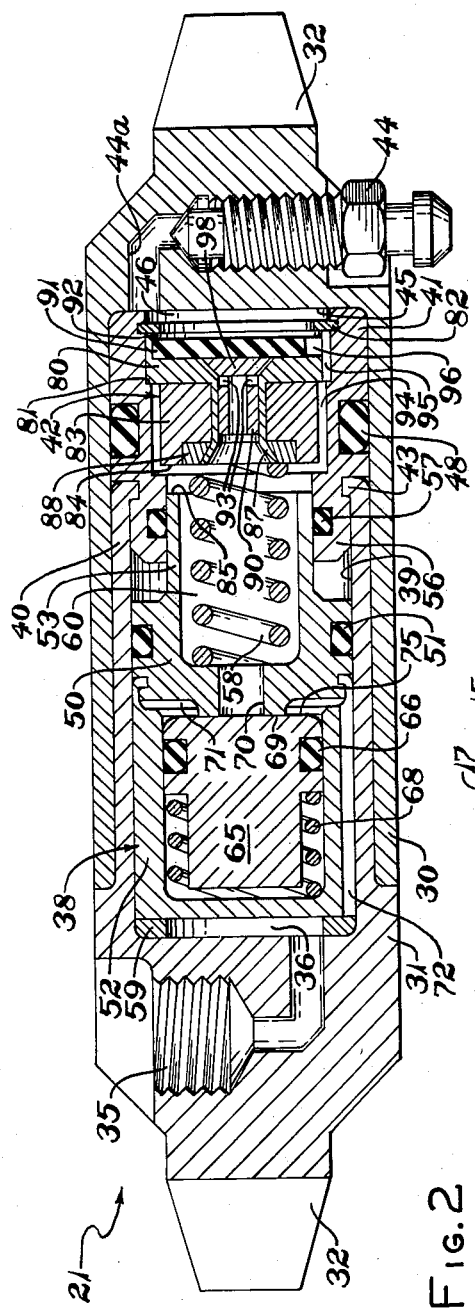

United States Patent Office 2,972,866
Patented Feb. 28, 1961

2,972,866
BRAKE SYSTEM

Burlin W. Oswalt, Union, Ohio, assignor to The B. F. Goodrich Company, New York, N.Y., a corporation of New York Filed July 3, 1958, Ser. No. 746,480
8 Claims. (Cl. 60—54.6)

This invention relates to hydraulic brake systems and more particularly to systems embodying mechanism for automatically adjusting brakes of the internal expanding self-energizable type to maintain uniform release clearance between the brake shoes and the adjoining brake drum.

The adjusting mechanism featured in the system of this invention is a two-way adjuster. That is to say, it is adapted to progressively adjust the release clearance of the brake shoes to compensate both for wear (permanent slack) and for changes brought about by thermal or resilient expansion and contraction of the brake members (transient slack). The adjusting mechanism functions entirely in response to changes in pressure and displacement of the hydraulic fluid for operating the brake and is positive, accurate and sensitive under all operating conditions.

The brake system of this invention advantageously provides for automatic adjustment of the so-called duo-servo internal expanding brakes characterized by a leading or "primary" shoe which when actuated in turn actuates a trailing or "secondary" shoe through an extensible link interconnecting the toes of these shoes. In accordance with this invention, the toes of the primary and secondary brake shoes are interconnected by a secondary fluid motor instead of by the manually adjustable screw link members which have been used heretofore between the shoes. A primary fluid motor is also engaged with the heel ends of the brake in the conventional manner for actuating the primary shoe.

The automatic adjusting mechanism is associated with the secondary motor and is located in series between this motor and a fluid pressure source which operates the secondary motor. When the brake is applied, the adjusting mechanism is operable in response to the fluid pressure source to meter a predetermined quantity of fluid to the secondary motor to actuate this motor prior to the actuation of the primary motor. The function of the secondary motor is to cause the toe ends of the shoes to engage the brake drum prior to the application of full braking pressure by the primary brake motor. The adjuster mechanism includes means to meter additional fluid to the secondary motor as required to compensate for slack (either permanent or transient) while the brake remains engaged. Additionally, the adjuster mechanism includes means operable on release of the secondary motor to meter only the aforesaid initial predetermined volume of fluid from the secondary motor; and it includes means for metering such additional quantities of fluid from the secondary motor as may be necessary to restore the desired release clearance after a change therein occurs resulting from the dissipation of the transient slack in the brake system.

In this brake system the adjuster mechanism has in series between it and the secondary brake motor a valve mechanism through which fluid is directed from the adjuster into the secondary motor. This valve mechanism is operable to pass fluid to the secondary motor when the latter motor is actuated but retards the exhaust flow from the secondary motor when the brake is released to delay the deactuation of the secondary motor until the primary brake motor is fully released.

The principles and concepts of this invention may be embodied in a number of different ways in brake systems of this general class. In the accompanying drawings there is shown one form of mechanism which is useful to explain the principles of this invention. In the form illustrated, both the adjusting mechanism and the valve mechanisms are incorporated into the secondary motor casing and this casing is located between the toe ends of the shoes wholly inside the brake drum.

In the drawings:

Fig. 1 is a view of an internal expanding self-energizing type brake embodying a secondary fluid motor and adjusting mechanism in accordance with this invention;

Fig. 2 is a longitudinal sectional view of the secondary motor including the adjusting mechanism therein, the view being drawn to an enlarged scale for clarity;

Fig. 7 is an enlarged fragmentary sectional view corresponding to the right end portion of Fig. 2 but showing certain valve mechanism therein in its open position.

Figure 3:
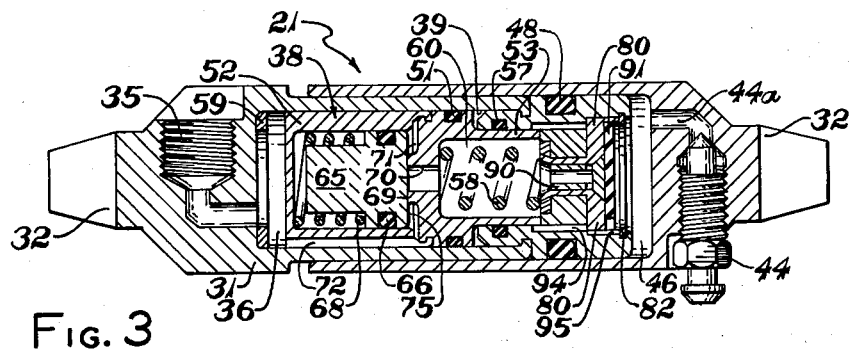
Figs. 3–6 are views similar to Fig. 2 but drawn on a smaller scale and showing the elements of the mechanism in their different positions at various stages of their operation.
Figure 4:
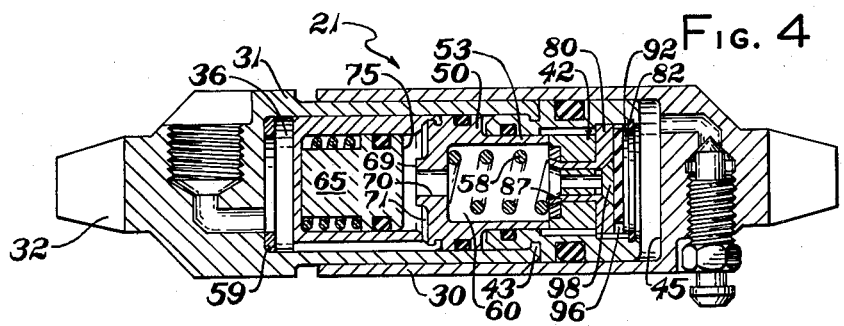

The brake 10 in Fig. 1 includes a primary shoe 11 and a secondary shoe 12, the rotation of the brake drum 10a being assumed clockwise as indicated by the arrow A. The shoes of the brake are shown in their disengaged condition, with a release clearance "t" indicated by the radial dimension arrows in Fig. 1. Each brake shoe 11 and 12 is of conventional T-shape in section and is mounted on a backing or torque plate 13 by a wobble stud 14. The heel ends 15 of both shoes are seated against a common stop member 17 and are urged against this stop by the upper or primary retractor springs 18 which are stretched under tension from a portion of the shoe flanges near the heels to the center stud 19 on the stop 17. In the de-energized position of the brake, the springs 18 maintain the brake shoes out of contact with the brake drum 10a with the release clearance "t" indicated.

The toe ends 20 of the brake shoes are inter-connected one with the other through a secondary motor 21. This latter motor as hereinafter explained is operable to position the toe ends of the shoes against the brake drum 10a when the brake is engaged against the opposition of a secondary retractor spring 22 which is also stretched between the toe ends of the shoes. The secondary retractor spring 22 is a very much weaker spring than the primary retractor springs 18 as hereinafter explained.

The primary braking force to operate the brake is obtained by means of a primary fluid motor 24 which includes opposed plungers 25 to urge the heel ends of the brake shoes against the brake drum. The primary motor 24 is a conventional opposed-piston brake motor which may be supplied with hydraulic fluid through an inlet 26 from a suitable pressure source such as a master cylinder (not shown).

The secondary motor 21 receives fluid from the primary motor 24 through a pipe or tube 28. Even though the primary motor is ahead of the secondary motor relative to the pressure source, the secondary motor is actuated before the primary motor 24 because the primary retractor springs 18 are very much stronger than the secondary retractor springs 22 and thus springs 18 delay the primary motor until the secondary motor is fully actuated. This particular form of pressure supply to the secondary motor 21 from motor 24 is optional and the secondary motor may be supplied directly from the fluid pressure source if desired.

Details of the secondary motor 21 will now be explained with reference to Figs. 2–7. Referring to Fig. 2, the motor 21 includes two telescopically engaged casing members, an outer casing member 30 and an inner casing member 31. The opposing ends of these casing members have forked end flanges 32 which embrace the center reinforcing flanges of the brake shoes at their toe ends as shown in Fig. 1.

Fluid pressure enters the secondary motor through an internal port 35 in the inner housing casing member 31. Through port 35 fluid is conducted into an inlet chamber 36 to act against a floating piston assembly 38 which is slidable in a bore 39 through the inner casing member 31. The forward end 40 of inner casing member 31 is connected rigidly to an annular fitting 41 in which a valve mechanism 42 is located. The fitting 41 is attached securely to the end 40 of the inner casing by flange members 43 which are rolled into engagement with a corresponding groove in fitting 41.

The outer casing 30 at its right end as shown in Fig. 2 includes a conventional bleeder screw 44 and a passage 44a leading thereto.

Between the valve mechanism 42 and the bottom 45 of outer casing 30, there is defined an expansion chamber 46. Thus when hydraulic fluid is passed into this chamber 46 through the valve mechanism 42 as hereinafter explained, the outer casing member 30 is urged telescopically forward on the inner casing member 31 as shown in Figs. 3–6. These casing members are sealed in slidable engagement by a main O-ring 48 encircling fitting 41.

The floating piston assembly 38 includes the main piston 50 sealed by an O-ring 51 in bore 39 of the inner casing. Attached to the main piston and carried with it is a pressure-sensing piston housing 52 located on the inlet side of piston 50. On the opposite side of piston 50 there is a tubular skirt 53 which projects forward toward the valve mechanism 42 and which is of smaller effective area than the rearward area of the floating piston assembly 38 exposed to the fluid in the inlet chamber 36. The skirt portion 53 slides inside a boss 56 of fitting 40 against an O-ring seal 57. Inside the skirt 53 there is caged a retractor spring 58 of the floating piston assembly which is compressed between the valve mechanism 42 and the main piston 50 to bias the floating piston assembly 38 leftward in Fig. 2 so that its housing 52 is seated tightly against a ring 59 located around the periphery of inlet chamber 36. The interior of the skirt portion 53 in the region in which spring 58 is housed together with the forward face of the valve mechanism 42 defines an intermediate or trap chamber 60 of the mechanism.

The floating piston assembly 38 is displaceable rightward toward the valve mechanism 42 in response to fluid pressure in its inlet chamber 36 to compress spring 58 and to displace a predetermined volume of fluid from the trap chamber 60 through the valve mechanism 42 into the expansion chamber 46. This action brings about the telescopic displacement of casing 30 relative to casing 31 to displace the toes of the shoes in Fig. 1 into engagement with the brake drum (see Fig. 3).

The floating piston assembly 38 additionally includes a pressure-sensing piston valve 65 sealed by O-ring 66 for reciprocation inside the pressure-sensing piston housing 52 carried by main piston 50. The piston valve 65 is biased forwardly by a spring 68 against a valve seat 69 on main piston 50 encircling a passage 70 through the center of piston 50 which opens into the inner intermediate chamber 60. Surrounding the valve seat 69 is a channel 71 which is filled with fluid from the inlet chamber through a port 72 formed in housing 52 and terminating against ring 59. In the retracted position of the floating piston assembly 38 the mouth of port 72 is closed from the inlet chamber 36 by the engagement of housing 52 with ring 59.

As soon as the floating piston assembly 38 is displaced forwardly in operation (see Fig. 3) the inlet chamber fluid pressure is communicated to channel 71 through port 72 where it can act against the marginal surface area 75 of piston valve 65. In response to a predetermined pressure of fluid in the inlet chamber 36, piston valve 65 is displaced toward the bottom of its housing 52 against the opposition of its biasing spring 68 to provide direct communication of fluid from the inlet chamber 36 through port 72, groove 71, past open valve 69 and through passage 70 into chamber 60 (cf. Fig. 4).

Referring now to Figs. 2 and 7, the valve mechanism 42 has several separate valving functions to perform. First, during the forward stroke of the floating piston it passes fluid from trap chamber 60 to expansion chamber 46, but at the limit of this stroke it checks this flow and locks the fluid in chamber 46. Secondly, in response to a slack condition in the brake, valve mechanism 42 has a one-way valve which permits fluid in chamber 60 to by-pass the lock out portions of the valve so that the expansion chamber 46 may be supplied with additional fluid from trap chamber 60 as needed to take up the slack. Finally, on release of the brake it retards back flow of fluid from chamber 46 until the primary motor 24 is fully released and the heels of the shoes are fully retracted.

The valve mechanism 42 includes a housing portion 80 (see Fig. 7) which is seated tightly in a groove 81 at the front end of fitting 41 by a snap ring 82. The housing 80 has fastened to it an annular lockout valve seat 83 having an annular sealing surface 84 to engage and seal against the end surface 85 of the skirt portion 53 of the floating piston assembly when this assembly reaches its rightward position. Seat 83 is connected to housing portion 80 by a central tubular portion 87 which extends toward and communicates with chamber 60. At its mouth, tube 87 is belled outwardly against a ring 88 which in turn engages the lockout seat 83 to anchor this seat firmly.

A one-way by-pass valve in this mechanism 42 consists of a tube 90 attached to the center of a rubber sealing disc 91 seated for axial displacement in a recess 92 in the side of a body 80 directed toward the expansion chamber 46. Normally, the pressure of fluid in the expansion chamber 46 acts against the rubber disc 91 to keep this disc seated tightly against the bottom of recess 92 in the position shown in Fig. 2. In this latter position, ports 93 through tube 90 (see Fig. 7) are closed by the axial position of the tube 90 inside tube 87.

While the floating piston assembly 38 is being advanced rightward toward the valve mechanism 42, fluid is displaced from chamber 60 through ports 94 and 95 at the periphery of valve seat 83 and the valve body 80, and then through openings 96 at the periphery of the rubber disc 91 into chamber 46.

When the forward face 85 from the skirt portion 53 engages the valve seat 84, the ports 94, etc. are closed as in Fig. 7. At least by the time the latter event occurs, however, the pressure sensing piston 65 of the floating piston assembly 38 is open so that the intermediate chamber 60 is in direct communication with the line pressure through inlet 35. If additional fluid is needed to compensate for wear, etc., this fluid can act on the center sliding tube 90 to displace the rubber disc 91 rightward against the snap ring 82 to the position shown in Fig. 7. The disc 91 is attached to a head portion 98 of the tube 90 which has conical external surfaces. Thus when tube 90 is displaced rightward as shown in Fig. 7 its ports 93 are open through the annular region 99 between the conical surface of head 98 and body 80 to supply added fluid to the expansion chamber 46. The additional fluid so introduced into chamber 46 acts to slide the outer casing 30 telescopically outward on casing 31. It should be noted that the expansion chamber 46 has no outlet except through the bleeder screw 44 which is, of course, closed while the mechanism is in operation.

Summary of operation

In service, all of the spaces inside the casing members 30 and 31 will be full of fluid except the region behind pressure sensing valve 65 (where spring 68 is located) and the region between the periphery of piston 50 and boss 56 of fitting 41.

In the initial stages of the application of brake pedal pressure, the resulting pressure of the hydraulic fluid for operating the brake supplied through tube 26 to motor 24 is comparatively low and is not adequate to actuate the piston motor 24 to overcome the strong primary retractor springs 18 near the heels of the brake shoes. Springs 18 delay the actuation of the motor 24 until after the secondary motor is actuated. The latter is designed for actuation at a much lower pressure than motor 24.

Accordingly, the low actuating pressure is transmitted through the motor casing 24 and tube 28 to inlet 35 of the secondary motor 21. The low inlet fluid pressure thus acts on the floating piston assembly 38 in inlet chamber 36 to displace the assembly forward (rightward as shown in Fig. 2); in turn displacing fluid in the intermediate chamber 60 through the passages 94, and 95 of the lock-out valve portions into the expansion chamber 46 at the right end of the casing in Fig. 2.

During this movement of the floating piston assembly 38, the by-pass valve disc 91 is held tightly closed because under these conditions the fluid in chamber 46 and in chamber 60 is at substantially the same pressure and the effective area of the by-pass valve disc 91 exposed to fluid of chamber 46 is much greater than the opposing effective area in chamber 60.

The fluid thus displaced into the expansion chamber 46 forces the outer housing member 30 to slide telescopically outward on the inner housing member 31 to elongate the casing. Thus the toe ends of each of the brake shoes are urged toward the brake drum.

The forward motion of the floating piston assembly 38 is arrested when the rim of its skirt 53 engages the annular lock-out valve seat 84 as shown in Fig. 3. In this latter position of the floating piston assembly the passages 94 and 95 leading around the lock-out valve body 83 into the expansion chamber 46 are closed and no further fluid via this route is introduced into the expansion chamber.

Figure 5:
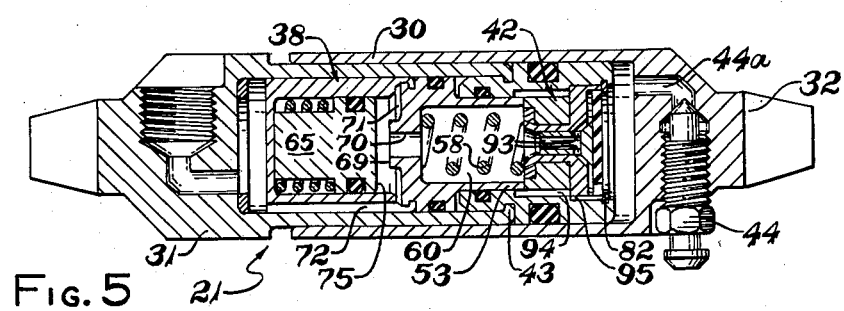
Figure 6:
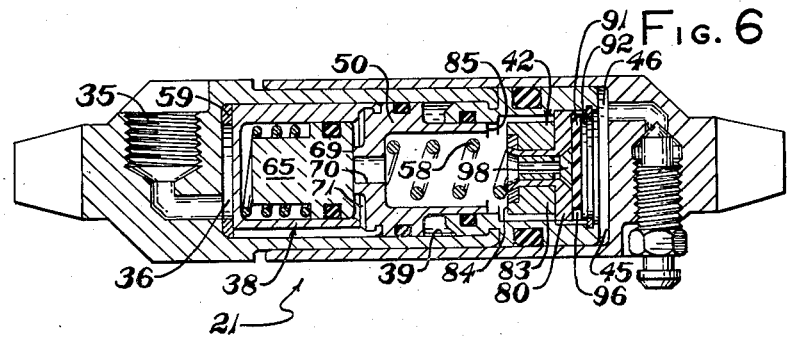

As soon as the floating piston assembly bottoms on the lock-out valve seat 84, the pressure of the fluid in the inlet chamber 36 rises rapidly to the full line pressure available. In this position of the floating piston assembly 38 the pressure sensing piston 65 inside the floating piston assembly is in direct communication with the inlet fluid through the port 72 and channel 71. Thus this pressure acts on the peripheral actuation area 75 of the pressure sensing piston to overcome the pressure sensing spring 68 and open port 70 so that there is now direct communication between the fluid inlet chamber 36 and the fluid in the intermediate chamber 60 as in Fig. 4. If when these events occur, the toes of the brake shoes are not already seated against the brake drum, then the high pressure in chamber 60 will force open the by-pass valve disc 91 and admit additional fluid to the expansion chamber 46 through the ports 93 and 99 as shown in Figs. 5 and 7, until the toe portions of the shoes are actually engaged with the drum.

Ordinarily the latter replenishing flow to chamber 46 occurs only when the brake is being operated under conditions resulting in brake fade through thermal expansion of the drum for normal or the usual brake actuation, the volume of the fluid displaced to the expansion chamber 46 by the floating piston assembly from the position in Fig. 2 to the position of Fig. 3 is just sufficient to engage the toe ends of the shoes with the drum 10a.

At about the same time the toe ends of the shoes are so engaged, the pressure of the actuating fluid will have risen sufficiently to operate the primary brake motor 24 to overcome the primary retractor springs 18 and urge the heel ends of the shoes against the brake drum. Thereafter, the action of the brake is essentially the conventional "duo servo" action. The primary shoe 11 is snubbed tightly against the brake drum and the reaction torque imposed on it by the drum rotation is transmitted to the secondary shoe 12 through the agency of the secondary motor casings 30 and 31. The secondary shoe in turn is snubbed against the brake drum and the torque thus exerted on the shoe is transmitted to the backing plate 13 by the engagement of the heel end of shoe 12 with stop 17.

When the brake is released, the pressure of the actuation fluid immediately drops to zero (or to a comparatively low back pressure as the case may be) and the strong springs 18 react almost simultaneously with the release of pressure to retract the heel ends of the brake shoes to their regular seated positions against the stop.

Simultaneously with the release of the primary motor, the fluid pressure in the inlet chamber 36 of the secondary motor casing 31 drops to zero so that the pressure sensing piston valve 65 promptly snaps closed against the valve seat 69 to prevent a back flow of fluid from the intermediate chamber 60. Concurrently, the floating piston spring 58 expands to return the floating piston assembly 38 leftward to its release position against the ring 59 (as in Fig. 6) to close off the fluid passage 72 to the pressure sensing piston. The leftward (Fig. 6) or retraction stroke of the floating piston assembly 38 occurs quickly because of the strength of spring 58 and the comparative large size of passages 35, 36 through which fluid is returned to the brake line. On the other hand ports 94, 95, and 93 are relatively small. Hence, there is a momentary but quite substantial reduction in pressure in chamber 60 accompanying the retraction of assembly 38. Valve 91 is therefore closed as a result of the pressure differential then existing between the fluid in chamber 60 and chamber 46 the latter being under pressure as a result of the biasing force of spring 22. This biasing force of spring 22 on the casing members 30 and 31 urges the outer casing member 30 telescopically onto the inner casing member 31 so that a volume of fluid is displaced from the expansion chamber 46 through the ports 95 and 94 to the intermediate chamber 60 equal to the displacement volume of the assembly 38. As soon as the latter chamber 60 is entirely full, the fluid remaining in the expansion chamber 46 will prevent further retraction of the toe ends of the shoes.

Because ports 95 and 94 are relatively small they throttle the back flow from the expansion chamber 46. This delays the retraction of the secondary motor until the primary motor is fully released. For proper operation the primary motor is released before the secondary motor.

It may therefore be seen that the displacement volume of the floating piston assembly is proportional to the release clearance desired between the shoes and the brake drum. If no wear occurs in the brake linings during a series of actuations by-pass valve disc 91 will not open and the same volume of fluid will be displaced from the intermediate chamber to the expansion chamber and vice versa each time the brake is operated. Throughout a period which the brake is engaged, the expansion chamber 46 can be supplied with fluid, however, through by-pass valve disc 91 from the line supply fluid via the inlet chamber 35, passages 72 and 71, past open valve seat 69, the port 70, the intermediate chamber 60, the ports 90, 93 and 99 and about the periphery of the by-pass valve disc 91. Thus as wear in the brake shoes occurs, a corresponding or proportional volume of the fluid will flow into the expansion chamber 46 to further elongate the casing members 30 and 31 to keep the toe ends pressed snugly and firmly against the brake drum.

On the release of the brake after an application where wear has occurred, the same events as described above occur except that the additional fluid volume added to the expansion chamber to compensate for slack will remain trapped therein, thus limiting the extent to which telescoping casing members can be telescopically retracted on release. In this manner, the desired release clearance between the brake drums and the toe ends of the shoes is maintained uniform regardless of the extent the linings may be worn.

Frequently during the operation of the brake, for example during prolonged actuation of the brake or repeated high energy stops, the brake drum may expand substantially in diameter. The shoes will remain engaged, however, because the toe ends of the shoes will be stepped progressively outward by the fluid entering the expansion chamber 46 from the brake line. When the brake is thereafter released, the shoes will be retracted through the same uniform release clearance as before, but after the brake drum has had an opportunity to cool, the resulting shrinkage of the drum may significantly reduce the release clearance.

The mechanism of this invention is adapted to automatically re-establish the desired release clearance on the next successive application of the brake when a condition like this occurs. When the brake pedal is actuated following such a situation, the floating piston assembly 38 will be displaced rightward in the manner described in the foregoing to effect elongation of the casing and engage the toe ends of the brake shoes. However, because of the reducation in the release clearance, the toe ends will make contact with the drum substantially before the floating piston 38 bottoms against its lock-out valve seat 84. Thus, there remains an excess of fluid in the intermediate and expansion chambers preventing the floating piston assembly 38 from executing its full stroke.

Regardless of where the floating piston assembly is halted, short of its bottomed position, however, the resulting increase in pressure of the inlet fluid will be effective to unseat the pressure sensing piston 65 and thereby equalize pressure fluid on opposite sides of the floating piston assembly. Then, because the effective hydraulic area of the side of the assembly 38 exposed to the inlet fluid pressure is greater than the effective hydraulic area of the side exposed to the intermediate chamber, there will be an unbalanced hydraulic force acting rightward on the floating piston assembly 38 which displaces the floating piston assembly 38 forward toward the lock-out valve seat 84, and the fluid so displaced in the intermediate chamber 60 flows backward or counter to the movement of the floating piston assembly through the port 70 and passages 71 and 70 into the inlet chamber 36.

This counter flow of fluid to inlet chamber 36 continues until assembly 38 bottoms against the lock-out valve seat 84 in the position shown in Fig. 2. Thus the quantity of fluid needed in the intermediate chamber 60 to make up the desired release clearance is automatically re-established or "metered" by the foregoing displacement motion of the floating piston assembly. Then when the brake pressure is subsequently released, the pressure sensing piston valve 65 will snap shut and the retraction of the shoes will bring about a displacement of fluid from the expansion chamber 46 back to the intermediate chamber proportional in volume to that desired to effect the uniform release clearance.

Accordingly, in the system of this invention, although the brake "fades" in each of a series of stops, the brake shoes will always be maintained snugly against the drum (within the design limits of the brake mechanism itself) and whenever the brake drum cools to its normal size, the uniform clearance is automatically re-established.

If the drum shrinkage is severe enough that it comes to exert constricting pressure on the shoes tending to lock the brake, there will be a corresponding increase in pressure in the expansion chamber 46 which will be transmitted to the intermediate chamber 60. If this pressure reaches a sufficient predetermined magnitude, it can act against the center of the piston valve 65 through port 70 and force open this piston valve to permit the excess pressure to bleed into the channel 71 and passage 72. The next time the brake is actuated, the adjuster mechanism will operate to reset the clearance as explained in the foregoing.

If desired, the engaged telescoping surfaces of casing members may be protected by surrounding them in a suitable accordion-shaped rubber sleeve or bellows or the like (not shown).

The ring 59 in the inlet chamber 36 is useful to lock fluid inside the casing members 30 and 31 by closing port 72 to the inlet fluid when certain types of "parking" or emergency brake mechanisms are associated with the brake. Such mechanism is not shown, but assuming it is of some conventional type which causes engagement of the shoes by some means other than the regular fluid supply through pipe 26, the resulting axial thrust on the casing members urges the assembly 38 tightly against the ring 59 so that the secondary motor is in effect a stiff rigid member extending between the toes of the shoes. For this reason, ring 59 may be designated a "parking brake ring." It may be included or omitted from the assembly depending on the particular type of parking brake used with the brake system. If the vehicle is equipped with a drive shaft brake, for example, ring 59 may be omitted and passage 72 may communicate directly with fluid inlet 35.

Variations in construction may be made within the scope of the appended claims.

I claim:

1. In an internal expanding self-energizable brake with a leading shoe and a trailing shoe and primary actuation means to engage the shoes with a brake drum, the improvement comprising a fluid-actuated automatic slack adjusting mechanism for interconnecting the toes of said shoes and operable for engaging said toes with the drum prior to the operation of said primary actuation means; said mechanism comprising a housing having a fluid inlet therein and being adapted to engage the toe of one of said shoes, a member engaged slidably with said housing and adapted to engage the toes of the other of said shoes, said latter member and portions of said housing defining an expansion chamber to receive fluid to effect relative axial displacement of said housing and said member, a floating piston assembly movable in said housing in response to actuating fluid pressure at said inlet, valve means in said housing axial with said floating piston assembly and defining with said assembly an intermediate chamber, means normally biasing said floating piston assembly away from said valve means, said valve means including a normally open passage communicating said intermediate chamber and said expansion chamber and means engageable by said floating piston assembly in the actuated position thereof to close the latter passage, and a one-way normally closed valve in said valve means operable to open in response to a predetermined pressure differential between said chambers to communicate said chambers when the latter said passage is closed; and a normally closed pressure sensing valve in said floating piston assembly operable to open to communicate said intermediate chamber with said inlet in response to a predetermined pressure of fluid in either said inlet or said intermediate chamber.

2. Mechanism in accordance with claim 1 wherein said floating piston assembly has a predetermined stroke in said intermediate chamber the displacement volume of the stroke being proportional to a preselected release clearance for said shoes, said predetermined volume of fluid of said intermediate chamber being displaced through said valve means to said expansion chamber by said assembly to axially extend said housing and said slidable member when actuating pressure is introduced at said inlet.

3. Mechanism in accordance with claim 2 wherein the floating piston assembly includes means for urging said assembly toward said actuated position thereof when said pressure sensing valve is open.

4. A hydraulic adjusting and actuating mechanism comprising a housing, a member slidably engaged with said housing for axial relative movement in response to fluid pressure force, said member and portions of said housing defining an expansion chamber to contain fluid to effect such movement, a fluid inlet in said housing, a floating piston assembly reciprocable in said housing from a retracted to an activated position in response to fluid pressure introduced to said inlet and being biased normally toward its retracted position, valve means in said housing between said assembly and said member and defining with said assembly an intermediate fluid chamber, said valve means including a passage open in the retracted position of said assembly to communicate fluid in said intermediate and said expansion chamber, said assembly being engageable with said valve means in said activated position to close said passage, a one-way normally closed valve in said valve means operable to open to communicate said chambers in response to a predetermined pressure differential of fluid in said chambers, and other normally closed valve means in said floating piston assembly operable to open in response to a predetermined fluid pressure either at said inlet or in said intermediate chamber to effect communication between said intermediate chamber and said fluid inlet through said floating piston assembly at any position of said assembly in said housing.

5. Mechanism in accordance with claim 4 in which said member is in telescopic engagement with an open end of said housing opposite said inlet, and wherein said expansion chamber is defined between said open end of said housing and the adjoining portions of said telescopic member.

6. Hydraulic adjusting and actuating mechanism comprising a housing, an inlet thereto, a floating piston assembly reciprocable in said housing from a retracted position to an actuated position in response to fluid pressure at said inlet, means normally biasing said assembly toward its retracted position, valve means in said housing spaced axially from said assembly and located at said actuated position of said assembly, said valve means defining with the assembly an intermediate chamber to contain actuating fluid, a passage in said valve means normally open to communicate said intermediate chamber with an additional quantity of fluid in turn in communication with hydraulically actuated equipment, said assembly being responsive to fluid pressure at said inlet to displace a predetermined quantity of fluid through said passage and to engage said valve means to close said passage when said assembly is brought to its actuated position, a one-way normally closed valve in said valve means operable in response to differential fluid pressure force to communicate fluid in said intermediate chamber with said other quantity of fluid when the assembly is in its actuated position, and said floating piston assembly including normally closed valve means operable to open in response to a predetermined fluid pressure of fluid either at said inlet or in said intermediate chamber to effect communication between said inlet and said intermediate chamber regardless of the position of said assembly in said housing.

7. Mechanism as in claim 6 including means for urging said floating piston assembly toward said actuated position when said valve means of said floating piston assembly is opened while said assembly is in a position away from said actuated position.

8. In a duo-servo brake system, a fluid-responsive actuator adapted for engagement between the toe-ends of a set of brake shoes, the actuator including an internal fluid pressure expansion chamber to operate said actuator to separate the toe-ends of the brake shoes of such system, a fluid-actuated automatic slack adjusting mechanism associated with said actuator, said mechanism comprising a housing having a fluid pressure inlet therein from a pressure source for operating said actuator, a floating piston assembly having a rearward side directed toward said inlet and being displaceable in said housing from a retracted position to a predetermined actuated position therein in response to pressure force at said inlet, means normally biasing said assembly toward said retracted position, means defining a closed conduit for containing fluid between the forward side of said assembly (the side opposite said inlet) and said expansion chamber of said actuator, valve means in said conduit defining an intermediate fluid chamber with the forward side of said assembly, said valve means having a normally open passage through which fluid is conducted from said intermediate chamber to said expansion chamber when said assembly is displaced to its actuated position, means on said assembly for closing said passage when the assembly is in said actuated position, the valve means further including a one-way normally-closed valve adapted to open to communicate fluid of said intermediate chamber with fluid of said expansion chamber in response to differential pressure force of such fluid in these chambers, and said floating piston assembly including a normally closed valve operable to open to communicate said intermediate chamber with said inlet in response to a predetermined fluid pressure in either said inlet or said intermediate chamber, and means for displacing said floating piston assembly toward said actuated position against said biasing means when said assembly valve is opened with the assembly at a location other than its actuated position.

References Cited in the file of this patent

UNITED STATES PATENTS

| | | |
|---|---|---|
| 2,048,472 | Sanford | July 21, 1936 |
| 2,638,186 | Oswalt | May 12, 1953 |
| 2,766,854 | Roumens et al. | Oct. 16, 1956 |
| 2,815,830 | Oswalt | Dec. 10, 1957 |
| 2,848,875 | Baldwin | Aug. 26, 1958 |
| 2,852,919 | Baldwin | Sept. 23, 1958 |